United States Patent [19]

Seng

[11] E Re. 31,574

[45] Reissued May 1, 1984

[54] APPARATUS FOR HANDLING HEAT-SOFTENABLE BATCH MATERIAL

[75] Inventor: Stephen Seng, Frazeysburg, Ohio

[73] Assignee: Owens-Corning Fiberglas Corporation, Toledo, Ohio

[21] Appl. No.: 343,057

[22] Filed: Jan. 27, 1982

Related U.S. Patent Documents

Reissue of:

[64] Patent No.: 4,212,613
Issued: Jul. 15, 1980
Appl. No.: 965,632
Filed: Dec. 1, 1978

U.S. Applications:

[62] Division of Ser. No. 809,595, Jun. 24, 1977.

[51] Int. Cl.[3] ..... B28B 17/00

[52] U.S. Cl. ..... 425/141; 425/147; 425/222

[58] Field of Search ..... 425/135, 141, 147, 222

[56] References Cited

U.S. PATENT DOCUMENTS 3,883,281 5/1975 Holley ..... 425/222
3,963,397 6/1976 Cyuzen et al. ..... 425/141

FOREIGN PATENT DOCUMENTS 46-38677 4/1971 Japan .

*Primary Examiner*—James R. Hall
*Attorney, Agent, or Firm*—Ronald C. Hudgens; Patrick P. Pacella; Robert F. Rywalski

[57] ABSTRACT

Apparatus is provided for handling heat-softenable batch material prior to melting it. The batch components are mixed together and then mixed with liquid and formed into balls or pellets of substantially uniform size and shape. The pellets are then collected into a heat-exchange chamber through which hot gases are passed from a melting unit in which the pellets are to be heated to a heat-softened state. The pellets thereby are preheated prior to entering the melting unit to save considerably on energy requirements. A physical characteristic and specifically the depth of a portion of the batch being formed into the pellets is sensed, the depth being related to moisture content. The ratio of the batch material and liquid is accordingly regulated to achieve uniformity in pellet size, which is influenced by the moisture content. Size uniformity is important in maintaining relatively free flow of the hot gases through the pellets in the heat-exchange chamber.

15 Claims, 5 Drawing Figures

APPARATUS FOR HANDLING HEAT-SOFTENABLE BATCH MATERIAL

Matter enclosed in heavy brackets [ ] appears in the original patent but forms no part of this reissue specification; matter printed in italics indicates the additions made by reissue.

This is a division of application Ser. No. 809,595, filed June 24, 1977.

This invention relates to apparatus for handling batch of heat-softenable material prior to being supplied to a melting unit.

It has been found to be advantageous to collect the products of combustion or hot gases over molten glass in a glass melting furnace or unit and to pass them in heat-exchange relationship with the batch material being supplied to the melting furnace. The batch can thus be preheated to elevated temperatures to save significant amounts of energy subsequently required to melt the batch. The exhaust gases otherwise are simply expelled to the atmosphere in many instances with a considerable waste of heat and energy.

Preferably, the heat-softenable batch material is in the form of balls or pellets in the heat-exchange chamber through which the hot gases are passed. However, it has been discovered that the pellet size must be substantially uniform. Otherwise, pellets of varying sizes tend to nest and provide excessive restriction to the flow of the gases past the pellets in the chamber. It has also been discovered that pellet size is important in addition to uniformity. If the pellets are too small, again undue restriction to the flow of the hot gases results. If the pellets are too large, their surface-to-weight ratio is accordingly reduced and the heat transferred to them is accordingly decreased. Also, trapped moisture in the larger pellets may turn to steam and cause the pellets to explode. Specifically, it has been found that pellets of one-half inch nominal diameter with a range from three-eighths inch to five-eights inch in diameter are the ultimate for obtaining maximum heat transfer from the hot exhaust gases to the pellets.

The pellets of the heat-softenable batch material preferably are made in a modified commercially-available pelletizer. The components of the batch are mixed together and then supplied to the pelletizer. During transportion to the pelletizer, the batch components tend to segregate so that the actual batch supplied to the pelletizer will vary, even though the final pellets produced and supplied to the melting furnace or unit average out so that the short variations are not material. However, the short variations in the batch components tend to affect the pellet-forming ability of the batch and the size of the pellets produced, other factors being constant. The feed rate of the batch to the pelletizer will also vary and thereby also affect pellet forming and pellet size. Liquid, and specifically water, is also supplied to the pelletizer near the batch supply. With the batch component or quantity variation. different size pellets will result when the water quantity is held constant. However, it has been found that the water quantity, or the ratio of the batch to the water, will also affect the pellet size, with more water resulting in larger pellets and less water resulting in smaller pellets, at least in most instances.

It has also been discovered that measuring a physicial characteristic of the batch on the pelletizer during the formation of the pellets can result in a forecast or prediction of pellet size so that the quantity of water or batch to water ratio can be changed to avoid an undesired increase or decrease in pellet size prior to its happening. More specifically, the depth of the batch material in the pelletizer at certain portions thereof can be measured and the water flow changed accordingly. An increased depth of the nuclei or seeds of the batch material indicates that water content is higher, the water tending to cause the seeds to stick together more and thus build up higher. Consequently, the amount of water supplied to the pelletizer is reduced when the sensing device indicates that the batch depth has reached a predetermined value. The excess water would otherwise tend to make fewer but larger diameter pellets, if not reduced. At the same time, if there is too little water, the depth of the nuclei or seeds of the batch decreases with the amount of water then being increased. The lesser amount of water otherwise would result in the individual final pellets thereby being smaller but in greater quantity.

It is, therefore, a principal object of the invention to provide an improved apparatus for handling heat-softenable batch material prior to supplying it to a melting unit.

Another object of the invention is to provide apparatus for preheating batch material prior to supplying it to a melting unit by forming the batch into pellets which are of a substantially uniform size and shape, and then supplying hot exhaust gases into heat-exchange relationship with the pellets.

A further object of the invention is to provide apparatus for producing pellets of a particulate batch material which are of substantially uniform size and shape.

Yet another object of the invention is to provide apparatus for producing uniformly-sized pellets by sensing a physical characteristic of batch material from which the pellets are made in a pelletizer.

Many other objects and advantages of the invention will be apparent from the following detailed description of preferred embodiments thereof, reference being made to the accompanying drawings, in which.

Figure 1:
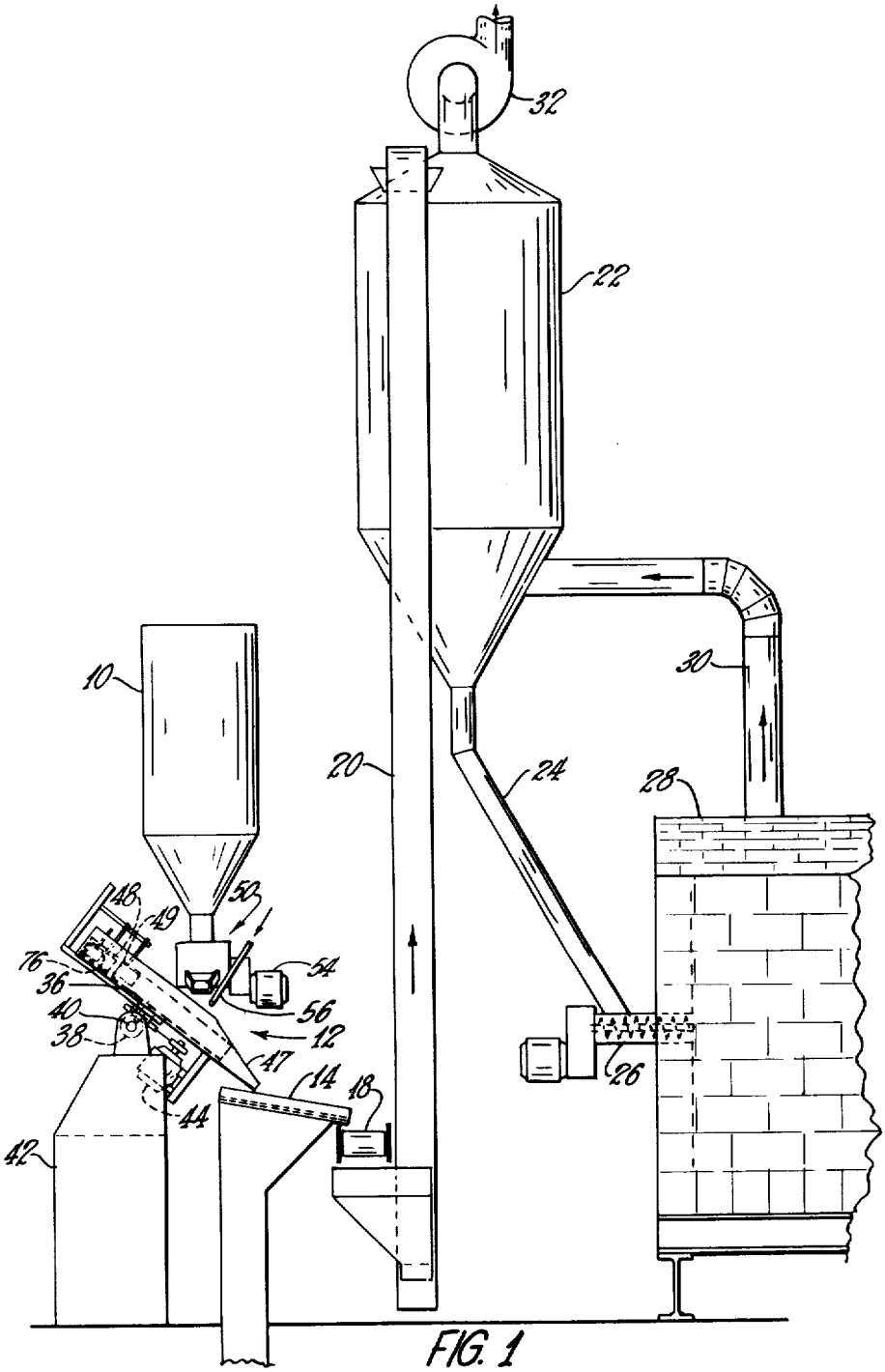
FIG. 1 is a somewhat schematic view in elevation of overall apparatus for handling heat-softenable batch material.

Referring to FIG. 1, particulate, heat-softenable batch material is transported to a supply hopper 10 and supplied to a pelletize 12. The particulate batch material is formed into pellets which are discharged onto a trough 14 having openings 16 (FIGS. 2 and 3) through which smaller or broken pellets can be separated. The pellets are supplied to a horizontal conveyor 18 and then carried up by a vertical conveyor 20 to the top of a heat-exchange hopper 22 which forms a heat-exchange chamber. The pellets next move down a supply tube 24 to a feeder 26 which carries the pellets into a melting unit or furnace 28.

Hot exhaust gases or products of combustion from the furnace 28 are carried up an exhaust stack 30 to the bottom of the hopper 22. The exhaust gases are then drawn through the hopper 22 by a blower 32 and discharged. The heat-exchange hopper 22 is large enough that the exhaust gases passing therethrough will be at a low velocity and not carry some of the pellets out through the blower 32. A substantial portion of the heat in the exhaust gases is transferred to the pellets in the heat-exchange hopper 22 so that the pellets are at an elevated temperature when they enter the furnace 28. A substantial increase in efficiency of the furnace 28 is thereby achieved.

The size uniformity of the pellets themselves is very important. If the pellet size varies too much, the pellets tend to nest together in the hopper 22 and excessively restrict the flow of the exhaust gases therethrough. However, if the pellets are of sufficienty uniform size, there will be sufficient voids among them that exhaust gases can pass through without excessive impediment. The nominal diameter of the pellets is also important because pellets which are too small provide excessive restriction to the flow of the exhaust gases. On the other hand, if the pellets are too large, their surface-to-weight ratio is lower and the heat transferred to them is decreased. Further, in the large pellets, moisture tends to be trapped therein and turned to steam by the exhaust gases, causing the pellets to explode. More specifically, by way of example, pellets having a nominal diameter of one-half inch with a range of three-eighths to five-eighths inch have been found to be the ultimate for obtaining maximum heat transfer from the exhaust gases to the pellets in the heat-exchange hopper 22.

The pelletizer 12 is intended to form the particulate batch material into the one-half inch nominal diameter pellets. Unfortunately, the components of the batch material supplied to the pelletizer 12 and specifically to the supply hopper 10 tend to segregate during transportation. Such segregation is not deleterious to the operation of the furnace 28 since the components of the pellets supplied thereto will average out over a period of time. However, the short variations in the batch components do affect the pellet-forming ability of the batch material. In other words, variations in the components of the batch material supplied to the pelletizer 12 will result in a change in pellet size, with other factors maintained constant. The feed rate of the batch to the pelletizer will also vary and change the pellet-forming ability and the pellet size with other factors being constant.

Liquid, and specifically water, is supplied to the pelletizer 12 and it has been found that the water quantity or the ratio of the water to the batch material will affect the pellet size. An increase in the amount of water or an increase in the ratio of the water to batch material results in larger pellets being produced, while less water results in smaller pellets, at least with most batch materials. Also, in accordance with the invention, it has been found that certain physical characteristics of the batch material on the pelletizer 12 can be sensed to control the flow of water or the ratio of water to batch material to maintain the pellet size in the desired range. More specifically, the depth of the batch material or the pellets being formed at certain portions of the pelletizer can be measured with the water flow then controlled accordingly. An increased depth of the nuclei or seeds of the batch material on which the pellets are formed indicates that the seeds are tending to stick together more and thus increase in depth. This occurs when the amount of water or ratio of water to batch material increases. When the depth increases, the amount of water supplied to the pelletizer is then reduced because a continued excess of water otherwise would cause fewer but larger pellets to be formed. Also, when the depth of the nuclei or seeds is less, they tend to stick together to a lesser extent, indicating that the water content has decreased and that the pellet size accordingly will be smaller. The amount of water is then increased to prevent this.

Figure 2:
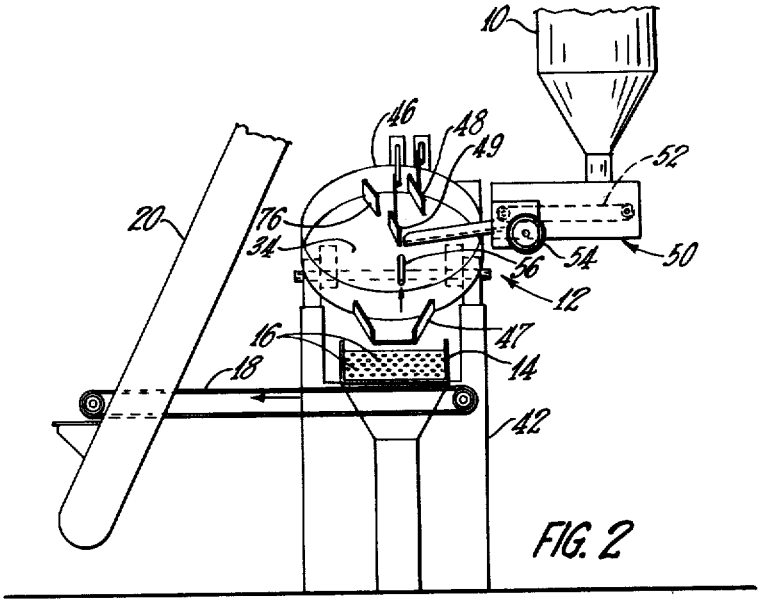
FIG. 2 is a front view in elevation of pelletizing apparatus shown in FIG. 1.
Figure 3:
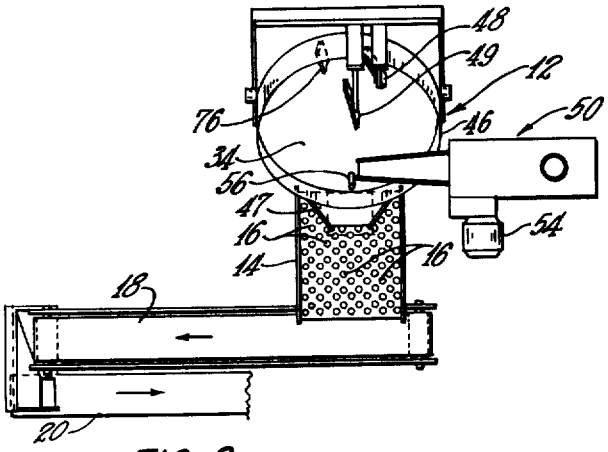
FIG. 3 is a top, plan view of the apparatus of FIG. 2.
Figure 4:
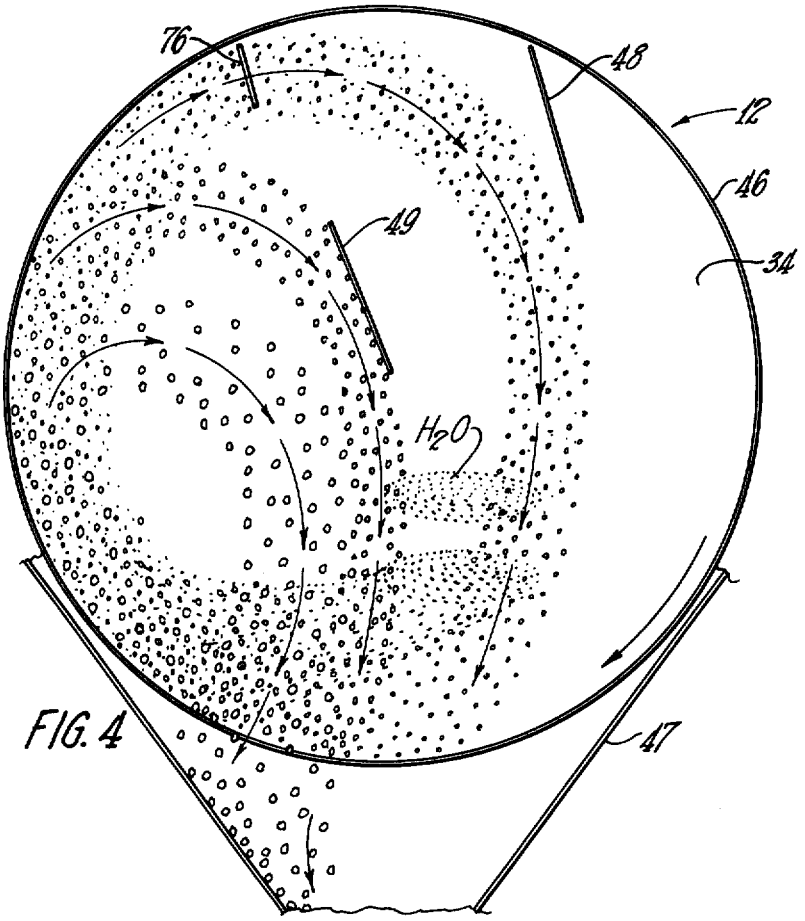
FIG. 4 is an enlarged diagrammatic view of a portion of the pelletizing apparatus.

Referring to FIGS. 2–4, the pelletizer 12 includes a movable surface 34 specifically formed by a rotatable member or disc, in this instance. The movable surface can also take other forms, however, such as a drum or a cone for producing the pellets. The disc 34 is rotatably carried on a bearing housing 36 (FIG. 1) which is pivotally mounted on arms 38 carried on an axle 40 which is mounted on a stand 42. The disc 34 is moved or rotated by a suitable motor 44. An annual wall 46 surrounds the rotatable member 34 with the pellets tumbling over this wall and down a spout 47 to the trough 14 when of the final size. An outer cleaning plow 48 (FIGS. 2 and 3) and an inner cleaning plow 49 clean the surface of the rotatable member 34.

Batch from the supply hopper 10 is supplied to a lower central portion of the rotatable member 34, as indicated in FIG. 4, by a suitable feeder 50. In this instance, the feeder 50 is shown as having a belt conveyor 52 (FIG. 2) driven by a motor 54; however, other conveyors such as vibratory conveyors can be equally well employed. While the feeder is intended to supply a constant quantity of batch, as a practical matter, the feed rate of substantially any feeder is subject to some variation. This requires changes in the water supply even though the batch components do not vary. In addition, water is supplied to a lower central portion of the rotatable member 34, at a portion thereof shown in FIG. 4, by a supply line or spout 56. With the rotatable member 34 rotating in a clockwise direction, as shown in FIG. 4, the batch is carried in generally elliptical paths as it moves up the surface, the surface being maintained at a preset angle to the horizontal, such as 45°, as determined by the position of the legs 38.

Actually, the wet batch moves in three rather distinct streams or paths as it is carried up the moving surface and falls back. In the outer path are seeds or nuclei of the batch on which the pellets form. In the middle path are partially formed pellets having diameters in the range of one-fourth to three-eights inch when pellets having a nominal diameter of one-half inch are to be produced. In the inner path are finished pellets which roll in a tight eliptical path until they tumble over the annular wall 46.

As the seeds or nuclei form, the particulate batch material gathers thereon in continuous layers to gradually increase the diameters of the partially formed pellets until the desired size is attained. As moisture or water is introduced to the agitated mass of particulate material, the capillary force of the water and the mechanical force of the agitation of the particulate material against the moving surface causes packing and coalescing of the material into firm bodies.

The batch material in the outer stream and also, at least to some extent, in the middle stream, tends to stick together more when there is more moisture of water in the batch, with the depth of the stream correspondingly increasing. When this depth reaches a predetermined value, the water is cut back with the build-up of the batch material accordingly decreasing again. Otherwise, with the higher water content, the batch tends to agglomerate onto existing nuclei or seeds more readily, rather than forming new seeds, with fewer or larger pellets thereby resulting. Oppositely, with less moisture or water,the agglomeration tendency of the particulate batch material is decreased with more nuclei or seeds forming, which results in more but smaller pellets since there are more nuclei on which a given amount of batch can form, and there is a lesser tendency for the batch to agglomerate.

Figure 5:
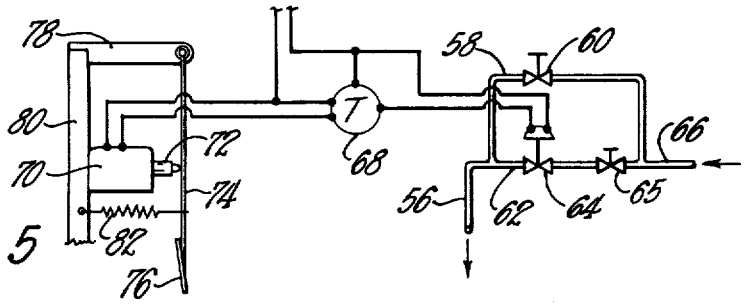
FIG. 5 is a diagrammatic view of controls for sensing batch material in the pelletizing apparatus and for controlling the flow of water to the apparatus.

The water supply through the spout 56 to the moving surface 34 can be controlled by the system shown diagramatically in FIG. 5. Accordingly, water is supplied to the spout 56 through a first branch passage or line 58 having a manually-controlled value 60 therein. Water can also be supplied to the spout 56 through a second branch passage or line 62 having a solenoid-operated valve 64 and a manually-controlled valve 65 for adjustment. Water for both of the lines 58 and 62 can be supplied through a suitable supply line 66. The flow of water through the line 58 to the spout 56 is such as to be less than the amount needed to produce the desired size pellets on the pelletizer 12. However, the flow of water through both of the lines 58 and 62, when the valve 64 is open, is in excess of the amount needed for producing pellets of the desired size.

By way of example, with a typical batch material which is supplied to the pelletizer 12 at the predetermined rate of 2000 pounds per hour, for example, a water supply of forty gallons per hour may be required to produce pellets of a given nominal diameter. However, for short variations in the batch components, the amount of water may need to be varied from perhaps 35–45 gallons per hour in order to maintain the pellet size relatively constant. In that instance, the water flow through the first branch passage 58 can be set at 30 gallons per hour, below the minimum required. The supply of water through the second branch passage 62 can then be set at 20 gallons per hour. The combined flow through both of the passages 58 and 62 will then be 50 gallons per hour, which is in excess of the maximum quantity of water required. Thus, liquid flow through the passage 58 is supplemented from time-to-time by flow through the passage 62 to obtain the pellets of the desired nominal diameter.

The control of the water through the passages 58 and 62 is regulated by a suitable sensing device which senses a physical characteristic of the particulate batch material on the surface 34. The sensing device can sense the water content, as previously discussed, and can do this by sensing the depth of the nuclei or partially formed pellets moving in the outer or middle streams on the surface 34. In the specific example shown, the solenoid valve 64 is controlled through a timer 68 which, when energized, supplies power through contacts therein to the solenoid of the valve 64 for a predetermined period of time, such as four seconds. Power to energize the timer, in turn, is controlled through a switch 70. The switch 70 has an actuating stem 72 connected with an arm 74 supporting a sensor or paddle 76. The arm 74, in turn, is pivotally supported by an overhead bar 78 connected to a post 80 at one side of the pelletizer wall 46. The arm 74 is normally held against the stem 72 by a spring 82 to keep the switch 70 open.

The paddle 76 is located near the annular wall 46 above an upper, outer portion of the surface 34 of the pelletizer. It preferably is in a position to determine the depth of the seeds or nuclei in the outer path of the batch material on the moving surface 34 but can also sense the depth of the partially formed pellets. When the depth of the batch material, whether seeds or pellets, reaches a predetermined amount or level, the paddle 76 is contacted and moved in a counterclockwise direction, as viewed in FIG. 5. The batch material, as discussed before, reaches the predetermined depth when the water content increases and causes it to stick together and build up. Consequently, when this condition occurs, it is desired to decrease the amount of water in the batch or decrease the ratio of the water to batch. For this purpose, when the paddle 76 is moved, it pulls the actuating stem 72 of the switch 70 outwardly to close the switch and energize the timer 68 for its predetermined period of time. When the timer is energized, it closes the valve 64 and results in only the water from the line 58 being supplied to the spout 56. Each time the paddle 76 is moved, it resets the timer 68 so that the valve 64 remains closed until the paddle is no longer contacted by the batch material for a period of time exceeding the period set on the timer. With this arrangement, the water content can be maintained substantially constant in the batch so that the desired nominal size of the pellets will be produced.

If desired, the sensor, or paddle, can be employed to control the flow of the batch material by the feeder 50. With the arrangement shown, the motor 54 can be a two-speed motor to drive the belt 52 at different speeds. If a vibrating feeder is employed, the rate of vibration can be controlled for the same purpose. Thus, instead of increasing the flow of water, the batch feed can be decreased, and vice versa.

Different types of sensors other than the paddle can also be employed. Thus, the depth of the pellets can be sensed by an electric eye. Also, ultrasonic waves or microwaves can be employed for this purpose. In addition, the sensing device can directly measure the water content of the particulate batch material, such as by infrared rays.

Various modifications of the above-described embodiments of the invention will be apparent to those skilled in the art, and it is to be understood that such modifications can be made without departing from the scope of the invention, if they are within the spirit and the tenor of the accompanying claims.

I claim:

1. In an apparatus for pelletizing a batch of particulate material, said apparatus comprising pellet forming means having a movable surface comprising a slanted rotatable member, means for moving said surface, means for supplying particulate batch material to said pellet forming means, means for supplying liquid to said pellet forming means, said apparatus being so arranged and constructed that said liquid and particulate batch material combine to form pelletized batch material, the improvement comprising means for directly sensing the depth of the batch material on said pellet forming means, and means for changing the ratio of the liquid to the particulate material in response to a change in the depth which is sensed.

2. Apparatus according to claim 1 wherein said sensing means senses the depth of the batch material on a predetemined portion of the movable surface, and said ratio changing means causing the supply of liquid to decrease when the depth reaches a predetermined value.

3. Apparatus according to claim 1 wherein said liquid supplying means comprises first passage means for supplying a given amount of liquid, second passage means for supplying an additional amount of liquid, and said ratio changing means comprises electrically-operated valve means located in said second passage means to control the flow of liquid therethrough.

4. The improvement of claim 1 wherein said sensing means comprises a biased sensor member.

5. The improvement of claim 4 wherein said sensor member is positioned at a predetermined location above said movable surface so as to be contacted by pelletized batch material and forced in a direction opposite to the bias.

6. The improvement of claim 4 wherein said sensing means comprises a spring biased sensor member.

7. In an apparatus for handling batch of heat-softenable particulate material prior to melting it, said apparatus comprising pellet forming means having a movable, slanted surface, means for moving the surface, means for supplying the batch to the pellet forming means, means for adding liquid to the pellet forming means to cause the batch to form pellets, means forming a heat-exchange chamber, means for supplying the pellets from the pellet forming means to said heat-exchange chamber, a melting unit, means for passing hot gases from said melting unit to said chamber to preheat the pellets, and means for supplying the preheated pellets from the chamber to the melting unit, the improvement comprising pivotally mounted means for directly sensing the depth of the pellets on said pellet-forming means, and means for changing the supply of liquid to the pellet forming means in response to the sensing means.

8. Apparatus for pelletizing a particulate material, said apparatus comprising a rotatable member having a slanted surface, means for rotating said member, means for supplying particulate material to a lower portion of said surface, means for supplying liquid to a lower portion of said surface, said material being carried up the slanted surface and moved down again in generally elliptical paths, said material forming pellets as it is moved along the surface, means for directly sensing the depth of the pellets on said rotatable member, a first passage means for supplying liquid to said liquid supply means in a quantity which is less than that normally needed to make pellets of a desired size, second passage means for supplying additional liquid to said liquid supply means, with the quantity of liquid from said first passage means and said second passage means, in combination, exceeding the quantity of liquid normally needed to make pellets of the desired size, valve means in said second passage means, and means responsive to said sensing means for opening and closing said valve means, including means for closing said valve means for a predetermined period of time when said sensing means senses the depth of material of a predetermined value.

9. In apparatus for pelletizing particulate batch on an inclined rotatable disc pelletizer by which pellets are formed, means for supplying said batch and water to said pelletizer, and means for sensing the material on the pelletizer, the improvement wherein said sensing means comprises a pivotally-supported, depth-sensing sensor, and control means for changing the ratio of water to the batch in response to a change in pivotal movement of said sensor.

10. Apparatus according to claim 9 wherein said sensor is pivotally moved in an upwardly direction when contacting the material.

*11. In an apparatus for pelletizing particulate batch on an inclined rotating disk pelletizer by which pellets are formed, comprising means for supplying said batch to said pelletizer; means for supplying water to said pelletizer; means for sensing the material on the pelletizer; the improvement wherein said sensing means comprises a pivotally-supported, depth sensing sensor positioned at a predetermined location above said pelletizer, said sensor being so arranged and constructed as to be contacted by material on said pelletizer when said material is at a predetermined depth and to move upon such contact, and control means for changing the ratio of supplied water to supplied batch in response to said movement of said sensor, and wherein said means for supplying water to said pelletizer continuously supplies water.*

*12. The apparatus of claim 11 wherein said sensor is located adjacent an upper outer portion of said rotating disk.*

*13. An apparatus for pelletizing particulate material to form pellets having a select substantially uniform size range and a select nominal diameter range comprising:*

*(a) an inclined rotating pelletizing disk adapted to receive particulate material and a pelletizing liquid and by a tumbling and rolling action to combine said liquid and particulate material to form wet material in the form of seeds or nuclei which increase in size to provide a wet material in the form of finished pellets;*

*(b) means for continuously supplying particulate material to said rotating disk;*

*(c) means for supplying pelletizing liquid to said rotating disk;*

*(d) a depth sensing sensor positioned at a predetemined level above said rotating disk, said sensor being adapted to move substantially upon contact thereof with wet material tumbling and rolling on said disk; and*

*(e) means for changing the supply of liquid to said disk in response to said movement of said sensor, said means being operatively associated with said liquid supply means so that liquid is continuously supplied to said disk.*

*14. The apparatus of claim 13 wherein said means for changing the supply of liquid decreases the supply.*

*15. The apparatus of claim 13 wherein said sensor is located above an upper outer portion of said disk.*

* * * * *